March 13, 1934. A. B. SEVERN 1,950,523
ROLLER SIDE BEARING
Filed June 29, 1931
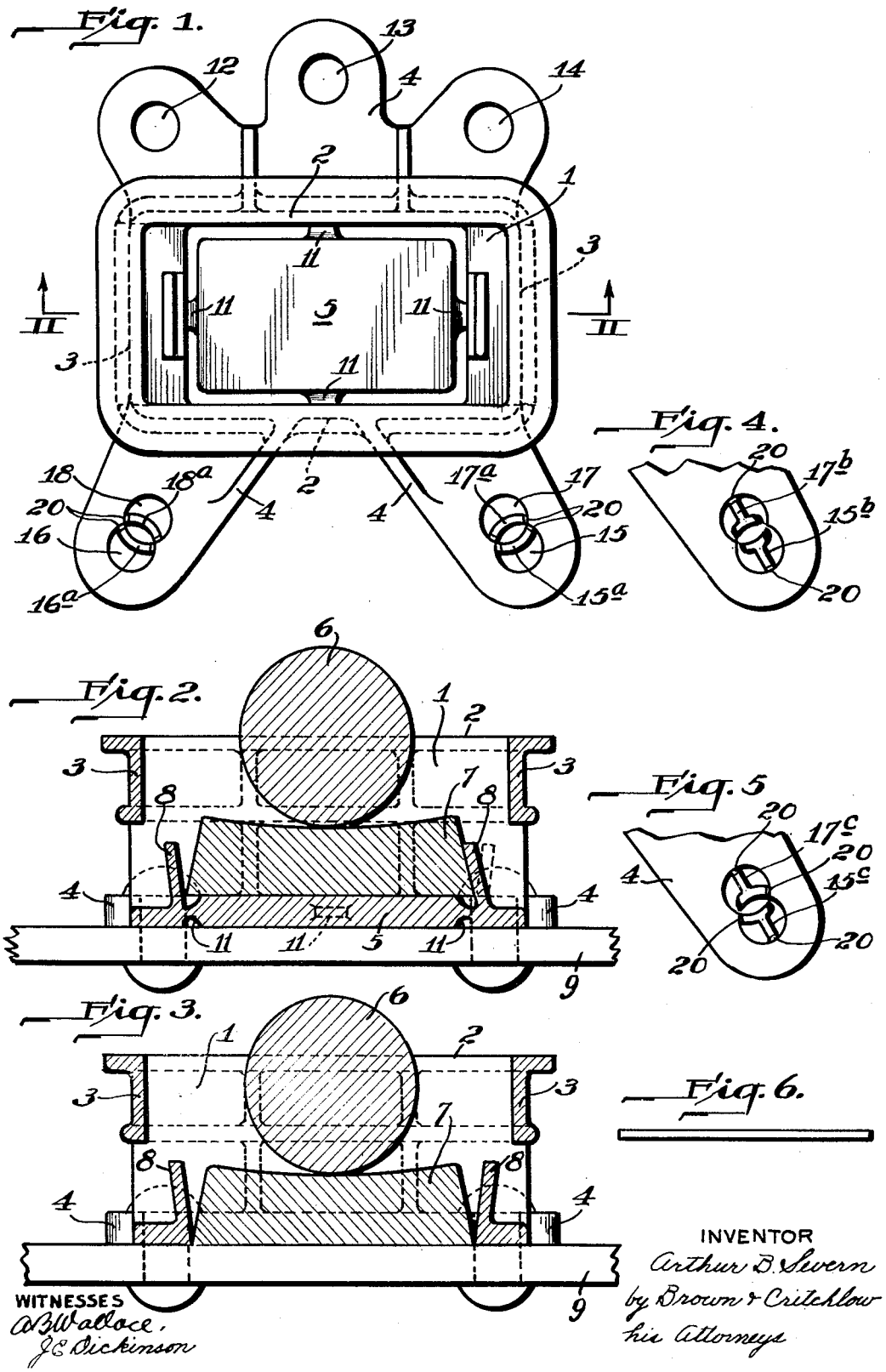
INVENTOR
Arthur B. Severn
by Brown & Critchlow
his Attorneys Patented Mar. 13, 1934

1,950,523

UNITED STATES PATENT OFFICE 1,950,523

ROLLER SIDE BEARING

Arthur B. Severn, Pittsburgh, Pa., assignor to Arnold Stucki, Pittsburgh, Pa.

Application June 29, 1931, Serial No. 547,629

6 Claims. (Cl. 308—226)

This invention relates to roller side bearings for railway cars, and particularly those of the type used on the bolsters of car trucks.

Side bearings of this character have been supplied to the railroads and car builders in the past by various manufacturers in various sizes, shapes and forms, and with various arrangements of rivet holes for attaching them to the car bolsters. Because of this, and because the railroad companies usually own many different types of cars in which various of these different makes of side bearings are used, it has been necessary heretofore for them to stock their repair shops with as many different kinds of spare side bearings as they have of different types in use in order to be prepared at all times to make repairs. Consequently, they have been forced to tie up a considerable outlay of capital in order to have as many different kinds of side bearings on hand as they may have occasion to use. In addition they have been put to a correspondingly large handling and storage expense, all of which have contributed to the expense of keeping their cars in running condition.

The principal differences between the greater percentage of the various kinds of these side bearings on the market reside in the different rivet arrangements employed by the different manufacturers for attaching their products to the car bolsters, and in the height at which the bearing rollers are supported in the cages above the top of the truck bolster. With respect to this latter difference the various bearings are substantially divided into classes of chiefly two different heights. The arrangements of the attachment rivet holes in the different bearing cages, however, are somewhat more varied, although the more standard makes which embody the greater percentage of bearings used may be divided into a comparatively small number of classes.

In view of such conditions, and with the end in mind of reducing the cost, as well as simplifying the making of repairs to the bearing of railway cars, it is the primary object of this invention, generally stated, to provide a roller side bearing which with but slight alterations may be readily substituted for any of the greater percentage of the different makes of bearings now in use.

A further object is to provide a roller side bearing of the character referred to, which is simple of construction, sturdy and dependable in operation, and susceptible of being manufactured at a relatively low cost.

These and other objects, as well as the various other novel features and advantages of the invention, will be apparent when the following detailed description is read in conjunction with the accompanying drawing, wherein Fig. 1 is a plan view of a bearing cage constructed in accordance with the invention; Fig. 2 a sectional view taken on the line II—II of Fig. 1, and showing the bearing roller and roller seat in place; Fig. 3 a view similar to Fig. 1 illustrating the bearing with the knock-out bottom of the cage removed; Figs. 4 and 5 plan views of two forms of knock-out braces designed for use in the rivet holes of the cage when they are so arranged as to overlap one another; and Fig. 6 a side view of a detachable seat supporting cam plate.

Referring in detail to the embodiment of the invention illustrated in the drawing, the numeral 1 designates generally the housing or cage of the bearing. This, as shown, comprises chiefly side and end walls 2 and 3, respectively, a base 4 and a knock-out bottom 5, and functions as a housing and support for a bearing roller 6 which is mounted in it upon a detachable roller seat 7. For convenience of assembly and use pliable lugs 8 are formed in the base of cage 1 for holding roller seat 7 in place, and adapted to permit their being bent tightly against the ends of the seat when the bearing is placed in service.

The knock-out bottom 5 which constitutes a feature of this invention is so made that its removal permits the roller seat 7 to be rested directly upon the top of the truck bolster 9 to which the cage is attached in use, and its thickness is such that when it is used it gives to the bearing a height corresponding to that of the bearings in the higher of the two most common classes in which such bearings now in use are substantially divided, as referred to above. And when removed it lowers the height of the bearing sufficiently to place it in the lower of such classes. Hence, by merely using or removing bottom 5, as far as the height of the bearing is concerned, it it adapted to be substituted for any of the greater majority of bearings now in use.

To facilitate the removal of bottom 5 when desired, it is attached to the cage proper by a plurality of lugs 11, which are disposed at spaced intervals about its periphery and extended into the base 4. These braces while made sufficiently strong to securely hold the bottom in place when it is in use, or the bearing is being shipped from one place to another, they nevertheless are so designed as to permit their being broken out with comparative ease so that the bottom can be removed without difficulty.

For adapting cage 1 to be substituted for any of a number of different makes of bearings in which various rivet hole arrangements are employed for securing them to the car bolster, base 4 is provided with a plurality of systematically arranged rivet holes 12, 13, 14, 15, 16, 17 and 18. The holes 12, 14, 15 and 16 are arranged to correspond to those used in one common make of bearing; the holes 12, 14, 17 and 18 to correspond to those used in another; the holes 13, 15 and 16 those used in another, and the holes 13, 17 and 18 those used in still another. In order that such a multiplicity of different combinations may be made, and the number of rivet holes in the base maintained at a minimum, holes 12, 13 and 14 are used in more than one combination of rivet-hole arrangements while the other holes, that is the holes 15, 16, 17 and 18 are allowed to overlap if necessary, as in the combinations shown.

To prevent these overlapping holes affecting the rivets when driven to place, knock-out braces 15a, 16a, 17a and 18a are provided in these holes. These braces are cast integrally with the cage and so shaped as to permit their being removed from the holes in which they are located with ease when necessary. They are also so shaped as to complete, or substantially complete, the side wall of the rivet hole adjoining the one in which they are located so as to give lateral support to a rivet when forced to place in a hole next to them. As shown in Figs. 1, 4 and 5, these braces may be made in various shapes and forms. For example, as shown in Fig. 4, braces 15b and 17b are illustrated as being attached to the base at only one point, while in Fig. 5 the braces 15c and 17c are attached at two points as are braces 15a and 17a in Fig. 1. To facilitate the removal of the braces, a notch 20 may be formed in each at the point or points where they are secured to the base. With such a provision while these rivet holes are allowed to overlap they do not affect the sturdiness of the structure and afford through the use of the knock-out braces a very simple way of multiplying the rivet hole arrangements possible.

In designing the bearing for a consumer the rivet holes are preferably laid out so as to adapt the cage to be substituted for the greatest possible number of different makes of bearings which a railroad or repair shop purchasing it may have occasion to repair, and in preparing the bearing for shipment the roller seats 7 and bearing rolls 6 are rested loosely in the cage so that they may be removed with ease, such as is necessary if the knock-out bottom is to be removed before the cage is attached to a car bolster. Furthermore, in shipment the lugs 8 are preferably extended perpendicular to the base of the cage and closed over the ends of the seats 7 only when the bearings are placed in service.

Where it is desired to substitute the bearing for a bearing of a height different from that provided when the knock-out bottom 5 is in place or when it is removed, a cam plate 21, such as shown in Fig. 6, may be employed. This cam plate may have any desired or necessary thickness, and may be placed on top of bottom 5 when the latter is in place or substituted for it, as the requirements may demand. Through such use the bearing may be made to correspond to any height desired, and accordingly the range of substitutions for which a bearing embodying the invention may be used is increased.

According to the provisions of the patent statutes, I have explained the principle and mode of operation of my invention and have illustrated and described what I now consider to represent its best embodiment. However, I desire to have it understood that, within the scope of the appended claims, the invention may be practiced otherwise than as specifically illustrated and described.

I claim:

1. A roller side bearing for railway cars comprising a cage including a base having a removable roller seat-supporting portion, said removable portion being integrally attached to said base by integral lugs extending between said base and said removable portion.

2. A railway side bearing cage having in it a base provided with a knock-out bottom portion, said knock-out portion being integrally attached to said base by integral lugs extending between said base and said knock-out portion.

3. A roller side bearing for railway cars comprising a cage having a knock-out portion in the base thereof, said portion being integrally attached to said base by integral lugs extending between said knock-out portion and the base, a roller seat detachably mounted in said cage, and a roller mounted for movement on said seat and said seat adapted to fit within the opening provided by said knock-out portion when the latter is removed.

4. A roller side bearing for railway cars comprising a cage, a roller seat detachably mounted in said cage, means for releasably holding said seat in the cage, a roller mounted for movement on said seat, and a knock-out portion provided in the base of said cage and integrally attached thereto by integral lugs extending between said base and said knock-out portion.

5. A roller side bearing for railway cars comprising a cage including a base having a removable portion integrally attached to it by integral lugs extending between said base and said removable portion, an adjustable roller seat arranged to rest on said removable portion when in place and to seat within the opening provided thereby when said removable portion is removed, and pliable lugs attached to said cage in a manner to releasably hold said roller seat in position.

6. A roller side bearing for railway cars comprising a cage including a base having a removable portion integrally attached thereto by integral lugs extending between it and the base, and a plurality of overlapping systematically arranged non-concentric rivet openings provided therein for adapting it to be attached to car bolsters designed for the reception of various forms of side bearings, a roller seat detachably arranged in said cage to seat on said removable portion and adapt to fit in the opening formed thereby when said portion is removed, and a bearing roller arranged to move on said roller seat.

ARTHUR B. SEVERN.